(12) United States Patent
Law et al.

(10) Patent No.: US 9,522,446 B2
(45) Date of Patent: Dec. 20, 2016

(54) METHOD AND APPARATUS FOR FORMING A HARD DISK DRIVE BASE PLATE WITH AN EXTENDED HEIGHT

(71) Applicant: CHEUNG WOH TECHNOLOGIES LTD., Singapore (SG)

(72) Inventors: Kung Ying Law, Singapore (SG); Yut Chai Loh, Zhuhai (CN)

(73) Assignee: Cheung Woh Technologies Ltd., Singapore (SG)

( * ) Notice: Subject to any disclaimer, the term of this patent is extended or adjusted under 35 U.S.C. 154(b) by 0 days.

(21) Appl. No.: 14/555,483

(22) Filed: Nov. 26, 2014

(65) Prior Publication Data

US 2016/0059368 A1 Mar. 3, 2016

(30) Foreign Application Priority Data

Aug. 27, 2014 (CN) .......................... 2014 1 0428999

(51) Int. Cl.
| | |
|---|---|
| *B23K 31/02* | (2006.01) |
| *B23P 17/04* | (2006.01) |
| *B23K 9/02* | (2006.01) |
| *B23P 13/04* | (2006.01) |
| *B23P 15/00* | (2006.01) |

(Continued)

(52) U.S. Cl.
CPC .............. *B23P 17/04* (2013.01); *B21C 23/085* (2013.01); *B21J 5/002* (2013.01); *B21K 1/26* (2013.01); *B21K 23/00* (2013.01); *B23K 9/02* (2013.01); *B23K 31/02* (2013.01); *B23K 37/04* (2013.01); *B23P 13/04* (2013.01); *B23P 15/00* (2013.01); *B23P 23/04* (2013.01); *G06F 1/181* (2013.01);

(Continued)

(58) Field of Classification Search
None
See application file for complete search history.

(56) References Cited

U.S. PATENT DOCUMENTS

| 1,712,524 A | 5/1929 | Schultz |
| 3,638,471 A | 2/1972 | Martin |

(Continued)

FOREIGN PATENT DOCUMENTS

| EP | 1 724 996 A2 | 11/2006 | |
| FR | 2854486 A1 * | 11/2004 | ........... G11B 33/123 |

(Continued)

OTHER PUBLICATIONS

AIDA Engineering, Ltd., "LFL New Leveler Feeder 300-E/300R—Providing Easier Small and Midsize Coil Handling", extracted from JIS Handbook, 2 pgs. (p. 1—picture with description, p. 2—LFL Main Specifications and Options), (prior to Aug. 16, 2000).

(Continued)

*Primary Examiner* — Kiley Stoner
(74) *Attorney, Agent, or Firm* — Blakely, Sokoloff, Taylor & Zafman LLP

(57) ABSTRACT

A method for forming a hard disk drive base plate with an extended height is described. The method may include forming an initial hard disk drive base plate, forming a filler shim, and forming a shroud. The method may also include joining the initial hard disk drive base plate, the filler shim, and the shroud to extend a height of walls of the formed initial hard disk drive base plate, and to form the hard disk drive base plate with the extended height.

14 Claims, 7 Drawing Sheets

(51) Int. Cl.
*G06F 1/18* (2006.01)
*B23K 37/04* (2006.01)
*B23P 23/04* (2006.01)
*B21K 23/00* (2006.01)
*B21J 5/00* (2006.01)
*B21K 1/26* (2006.01)
*B21C 23/08* (2006.01)

(52) U.S. Cl.
CPC ........ *B23K 2201/04* (2013.01); *B23K 2203/10* (2013.01)

(56) References Cited

U.S. PATENT DOCUMENTS

| | | | |
|---|---|---|---|
| 3,860,803 A | 1/1975 | Levine | |
| 4,023,313 A | 5/1977 | LeBlanc | |
| 4,106,422 A | 8/1978 | Buhrke | |
| 4,651,773 A | 3/1987 | Takahashi et al. | |
| 4,785,523 A | 11/1988 | Koseki et al. | |
| 4,821,403 A | 4/1989 | Rolland et al. | |
| 5,034,837 A | 7/1991 | Schmitz | |
| 5,047,604 A | 9/1991 | Grass et al. | |
| 5,313,124 A | 5/1994 | Macpherson | |
| 5,347,888 A | 9/1994 | Yoshino et al. | |
| 5,417,097 A | 5/1995 | Kojima et al. | |
| 5,519,184 A * | 5/1996 | Umlas | B23K 26/206 219/121.63 |
| 5,584,202 A | 12/1996 | Kanamura et al. | |
| 5,587,856 A | 12/1996 | Aoyama | |
| 5,602,700 A | 2/1997 | Viskochil et al. | |
| 5,624,319 A | 4/1997 | Golcyzk et al. | |
| 5,649,442 A | 7/1997 | Yoshikawa et al. | |
| 5,765,275 A | 6/1998 | Obara | |
| 5,815,345 A * | 9/1998 | Pelstring | G11B 19/2009 310/268 |
| 5,880,904 A | 3/1999 | Mizoshita et al. | |
| 5,898,537 A | 4/1999 | Oizumi et al. | |
| 5,906,083 A | 5/1999 | Olsen et al. | |
| 5,941,113 A | 8/1999 | Kanemitsu et al. | |
| 5,966,976 A | 10/1999 | Haraga | |
| 6,018,977 A | 2/2000 | Kanno et al. | |
| 6,023,392 A | 2/2000 | Kim | |
| 6,063,508 A | 5/2000 | Hanrahan et al. | |
| 6,075,695 A | 6/2000 | Konno et al. | |
| 6,084,750 A | 7/2000 | Shimazu et al. | |
| 6,178,061 B1 | 1/2001 | Obara | |
| 6,191,921 B1 | 2/2001 | Hanrahan et al. | |
| 6,227,029 B1 | 5/2001 | Stanley | |
| 6,250,127 B1 | 6/2001 | Polese et al. | |
| 6,257,656 B1 * | 7/2001 | Cook | B62D 27/06 16/260 |
| 6,263,679 B1 * | 7/2001 | Paynting | F04B 37/08 277/630 |
| 6,275,353 B1 | 8/2001 | Briggs | |
| 6,307,713 B1 | 10/2001 | Miyata et al. | |
| 6,327,151 B1 | 12/2001 | Chen et al. | |
| 6,337,782 B1 | 1/2002 | Guerin et al. | |
| 6,382,064 B1 | 5/2002 | Dugger | |
| 6,389,869 B1 | 5/2002 | Wakita et al. | |
| 6,397,651 B2 | 6/2002 | Usui | |
| 6,402,009 B1 | 6/2002 | Ishikawa | |
| 6,411,581 B1 | 6/2002 | Saitou et al. | |
| 6,426,847 B1 | 7/2002 | Dague et al. | |
| 6,427,317 B1 | 8/2002 | Choi | |
| 6,430,799 B1 | 8/2002 | Ballard et al. | |
| 6,542,459 B2 | 4/2003 | Miyazaki et al. | |
| 6,608,732 B2 | 8/2003 | Bernett et al. | |
| 6,664,663 B1 * | 12/2003 | Yeo | G11B 5/4813 310/12.08 |
| 6,678,574 B2 | 1/2004 | Fujii et al. | |
| 6,762,909 B2 | 7/2004 | Albrecht et al. | |
| 6,930,858 B2 | 8/2005 | Gunderson et al. | |
| 6,982,850 B1 | 1/2006 | Ying | |
| 7,119,984 B2 | 10/2006 | Macleod et al. | |
| 7,146,713 B1 | 12/2006 | Ying | |
| 7,546,669 B1 | 6/2009 | Ying | |
| 7,628,129 B2 | 12/2009 | Takeshima et al. | |
| 7,849,578 B2 | 12/2010 | Ying | |
| 8,605,413 B2 * | 12/2013 | Wang | B23K 26/242 361/679.01 |
| 8,619,386 B2 * | 12/2013 | Chan | 360/97.13 |
| 8,797,679 B1 | 8/2014 | Rosner et al. | |
| 9,001,458 B1 * | 4/2015 | Vitikkate | G11B 25/043 360/97.22 |
| 9,058,851 B1 * | 6/2015 | Hanke | G11B 33/1486 |
| 2002/0054806 A1 | 5/2002 | Sakamura et al. | |
| 2003/0076306 A1 | 4/2003 | Zadesky et al. | |
| 2003/0095096 A1 | 5/2003 | Robbin et al. | |
| 2004/0184183 A1 * | 9/2004 | Ogata | G11B 33/08 360/97.11 |
| 2005/0045601 A1 * | 3/2005 | Kashima | B23K 26/22 219/121.63 |
| 2005/0068666 A1 * | 3/2005 | Albrecht | G11B 33/1466 360/99.18 |
| 2006/0002067 A1 * | 1/2006 | Gunderson | G11B 25/043 361/724 |
| 2006/0050429 A1 * | 3/2006 | Gunderson | G11B 33/122 360/99.21 |
| 2006/0061904 A1 * | 3/2006 | Neal | G11B 5/102 360/99.15 |
| 2007/0000114 A1 | 1/2007 | Franco et al. | |
| 2007/0008697 A1 * | 1/2007 | Choi | G11B 33/08 361/679.36 |
| 2007/0194084 A1 * | 8/2007 | Arya | G11B 33/12 228/101 |
| 2007/0245799 A1 | 10/2007 | Asakawa | |
| 2007/0277579 A1 | 12/2007 | Ruste | |
| 2008/0247082 A1 * | 10/2008 | Kavosh | G11B 25/043 360/99.21 |
| 2009/0133462 A1 | 5/2009 | Cairo et al. | |
| 2009/0235517 A1 | 9/2009 | Ying | |
| 2011/0141682 A1 * | 6/2011 | Chen | G11B 33/025 361/679.33 |
| 2011/0310509 A1 * | 12/2011 | Stipe | G11B 25/043 360/97.22 |
| 2012/0196152 A1 * | 8/2012 | Mashimo | G11B 5/482 428/800 |
| 2012/0275287 A1 * | 11/2012 | McGuire, Jr. | G11B 25/043 369/75.11 |
| 2013/0088795 A1 * | 4/2013 | Brown | G11B 25/043 360/97.14 |
| 2013/0170074 A1 * | 7/2013 | Hayakawa | G11B 33/148 360/97.22 |
| 2013/0208415 A1 * | 8/2013 | Thijssen | G11B 25/043 361/679.33 |
| 2013/0283877 A1 | 10/2013 | Law | |
| 2014/0118863 A1 * | 5/2014 | Nesori | G11B 5/483 360/244.7 |
| 2015/0201522 A1 * | 7/2015 | Jau | G11B 33/128 312/330.1 |
| 2015/0294691 A1 * | 10/2015 | Inaba | G11B 5/84 360/97.22 |

FOREIGN PATENT DOCUMENTS

| | | | |
|---|---|---|---|
| GB | 1273934 | 5/1972 | |
| JP | 5331791 | 8/1978 | |
| JP | 58077720 A | 5/1983 | |
| JP | 6128164 | 2/1986 | |
| JP | 63036932 A | 2/1988 | |
| JP | 04341986 A * | 11/1992 | |
| JP | 05094668 A | 4/1993 | |
| JP | 05123755 A | 5/1993 | |
| JP | 08153386 A | 6/1996 | |
| JP | 09120669 A | 5/1997 | |
| JP | 2005235376 A * | 9/2005 | |
| JP | 2010151285 A * | 7/2010 | |
| KR | 20130066800 A * | 6/2013 | G11B 33/146 |

(56) References Cited

FOREIGN PATENT DOCUMENTS

WO      WO 03/088176 A1    10/2003
WO      WO 2006/009516 A1    1/2006

OTHER PUBLICATIONS

AIDA Engineering, Ltd., "AIDA Press Handbook (Third Edition)", 37 pgs. (including cover page, foreward, table of contents, and relevant pages), (1992).
Aluminum Extrusion Industries (AEI), "Quality That Always Shines Through", 3 pgs., (prior to Aug. 16, 2000).
Japanese Standards Association, JIS Handbook 1986: "Non-Ferrous Metals and Metallurgy", 13 pgs. (including cover page, copyright, foreward, table of contents, and relevant pages), (1986).
"The E Coating Process Overview", 4 pgs., (Jan. 2, 1998).
Search Report of the Intellectual Property Office of Singapore for counterpart Singapore Application No. 10201408462V, 2 pgs., (Oct. 5, 2015).
Written Opinion of the Intellectual Property Office of Singapore for counterpart Singapore Application No. 10201408462V, 6 pgs., (Oct. 23, 2015).
Japanese Office Action with English Translation for Japanese Appln. No. 2014-257121, mailed Apr. 11, 2016, 9 pages.

\* cited by examiner

CROSS SECTION L-L

METHOD AND APPARATUS FOR FORMING A HARD DISK DRIVE BASE PLATE WITH AN EXTENDED HEIGHT

FIELD

Embodiments of the present invention relate generally to the field of manufacturing metal parts and more specifically, a manufacturing process for forming a hard disk drive base plate with an extended height.

BACKGROUND

The housing of a hard disk drive for use in computer systems typically includes a cover and a base plate attached with screws. A base plate supports the hard disk drive assembly (e.g., spindle, motor, and actuator).

One conventional base plate manufacturing process includes press working a sheet of metal with side frames mounted on opposing sides. In this process, a base plate is press worked to form a concave portion with a few holes for motor mounting. Two side frames are press worked from sheet metal and are fixedly mounted on the opposite sides of the base plate.

When a base plate is formed by a forging process performed on a blank, the height of the side walls is limited. The forging process applies plastic deformation on the original blank, such that the resultant formed hard disk drive base plate shape is irreversibly formed. Due, however, to the limitations of plastic deformation and the chosen blank material, the wall height of the walls of the formed hard disk drive base plate are not sufficient to house a finished hard disk drive, including the spindle, motor, actuator, and other parts of a hard disk drive assembly.

SUMMARY

A method for forming a hard disk drive base plate with an extended height is described. An initial hard disk drive base plate, a filler shim, and a shroud are formed. The initial hard disk drive base plate, the filler shim, and the shroud are joined to extend a height of walls of the formed initial hard disk drive base plate, and to form the hard disk drive base plate with the extended height.

A production system for forming a hard disk drive base plate with an extended height is also described. A first stage of the production system is used to advance a blank cut from an extruded sheet through multiple stations of a transfer die assembly to form an initial hard disk drive base plate. A second stage of the production system is used to punch a filler shim from a sheet of metal. A third stage of the production system is used to form a shroud. Finally, a fourth stage of the production system is used to join the initial hard disk drive base plate, the filler shim, and the shroud to extend a height of walls of the formed initial hard disk drive base plate and to form the hard disk drive base plate with the extended height.

BRIEF DESCRIPTION OF THE DRAWINGS

Embodiments of the present invention are illustrated by way of example, and not limitation, in the figures of the accompanying drawings in which.

DETAILED DESCRIPTION

A method using a formed hard disk drive base plate, a shroud, and a filler shim to form a hard disk drive base plate with an extended height is described. For one embodiment, an initial blank base plate is advanced through a plurality of stations of a transfer die assembly to form and forge a hard disk drive base plate. A shroud to extend the height of the formed and forged hard disk drive base plate is also formed. For one embodiment, the forming of the shroud may include forging the shroud through a plurality of stations, similar the forming of the hard disk drive base plate. For another embodiment, the forming of the shroud may also be performed by generating a hollow bar through a metal extrusion process, and cutting sections from the hollow bar with a saw to obtain shrouds of a desired height. For one embodiment, a filler shim is also created by stamping a thin metal sheet. In the embodiments discussed below, the hard disk drive base plate, filler shim, and shroud are joined. For example, the hard disk drive base plate may be welded to the shroud with the filler shim disposed therebetween. The welding together of the hard disk drive base plate, filler shim, and shroud forms the extended height hard disk drive base plate, which may then be utilized in the assembly of a hard disk drive.

Below is a discussion of the component parts, their relationship with one another, and the finished extended height hard disk drive base plate. The processes for forming the component parts are then described. Finally, the process for welding and finishing the extended height hard disk drive base plate is described.

Figure 1:
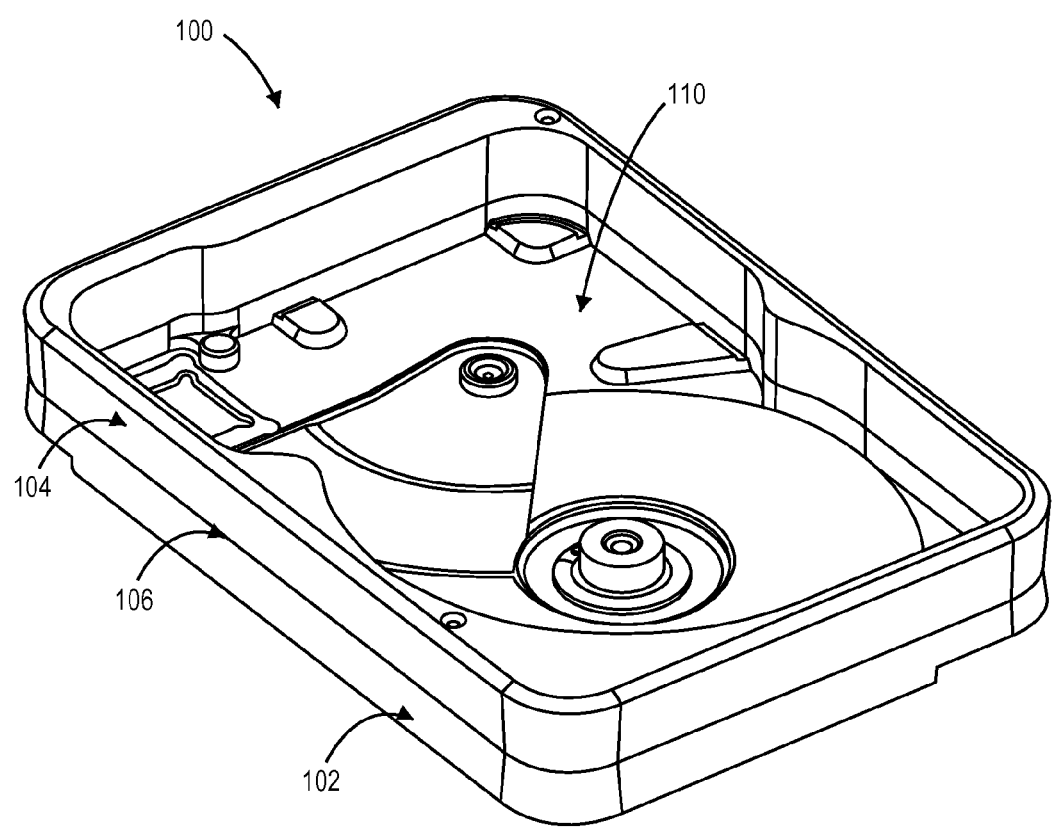
FIG. 1 illustrates a joined hard disk drive base plate with an extended height.
Figure 2A:
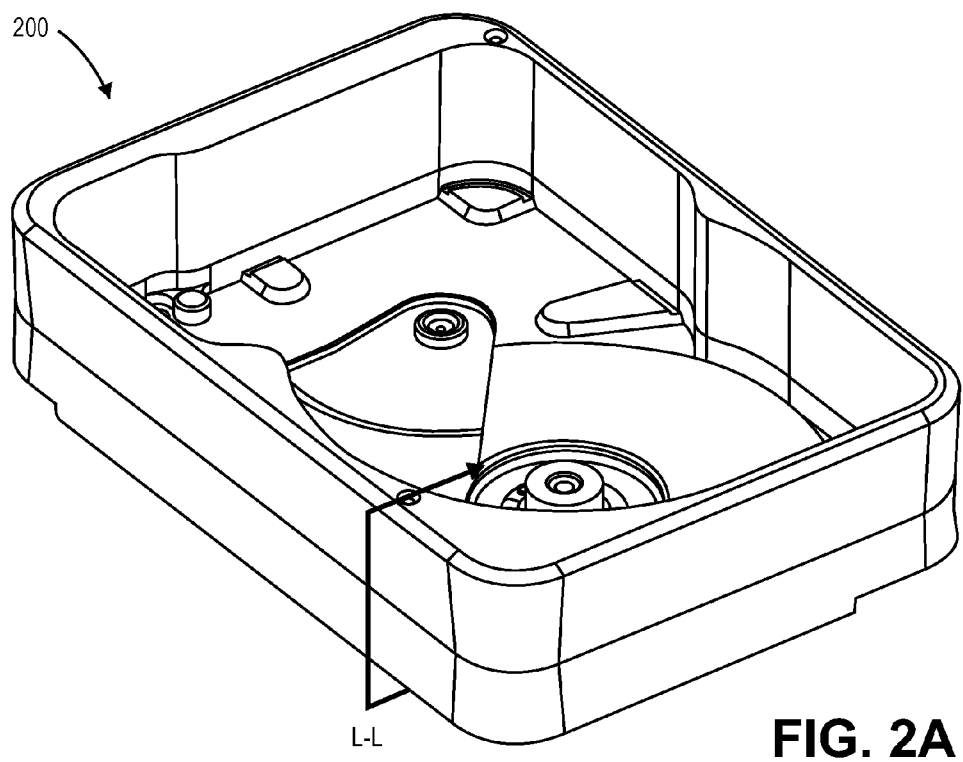
FIG. 2A provides another illustration of the joined extended height hard disk drive base plate with a reference to a cross section location.
Figure 2B:
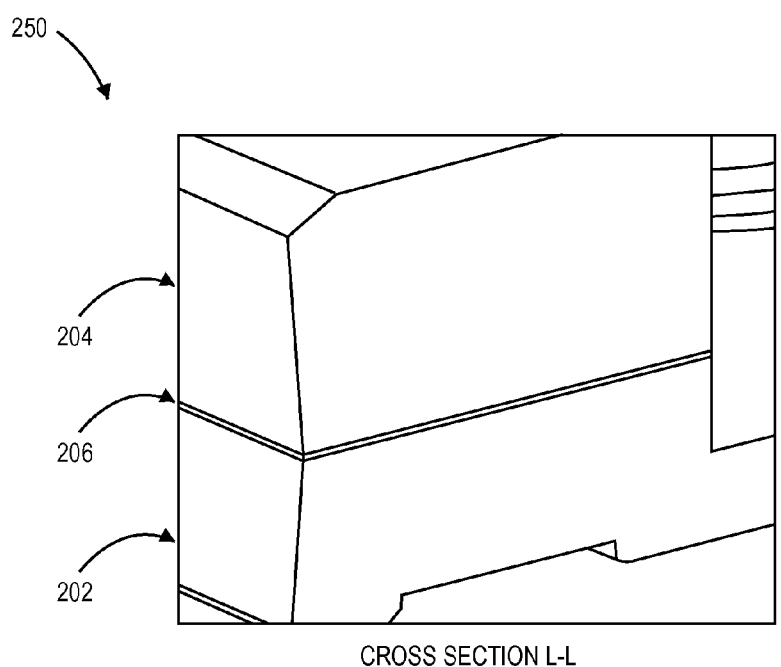
FIG. 2B illustrates the cross section of the joined hard disk drive base plate referenced in FIG. 2A.

FIG. 1 illustrates a joined hard disk drive base plate 100 with an extended height. The extended height hard disk drive base plate with formed parts 110, as discussed in greater detail below, is formed by joining hard disk drive base plate 102, filler shim 106, and shroud 104. FIG. 2A provides another illustration of the joined extended height hard disk drive base plate 200 with a reference to a cross section location L-L. FIG. 2B illustrates cross section L-L of the base plate 202, filler shim 206, and shroud 204 of the joined hard disk drive base plate 250 illustrated in FIG. 2A.

Figure 3:
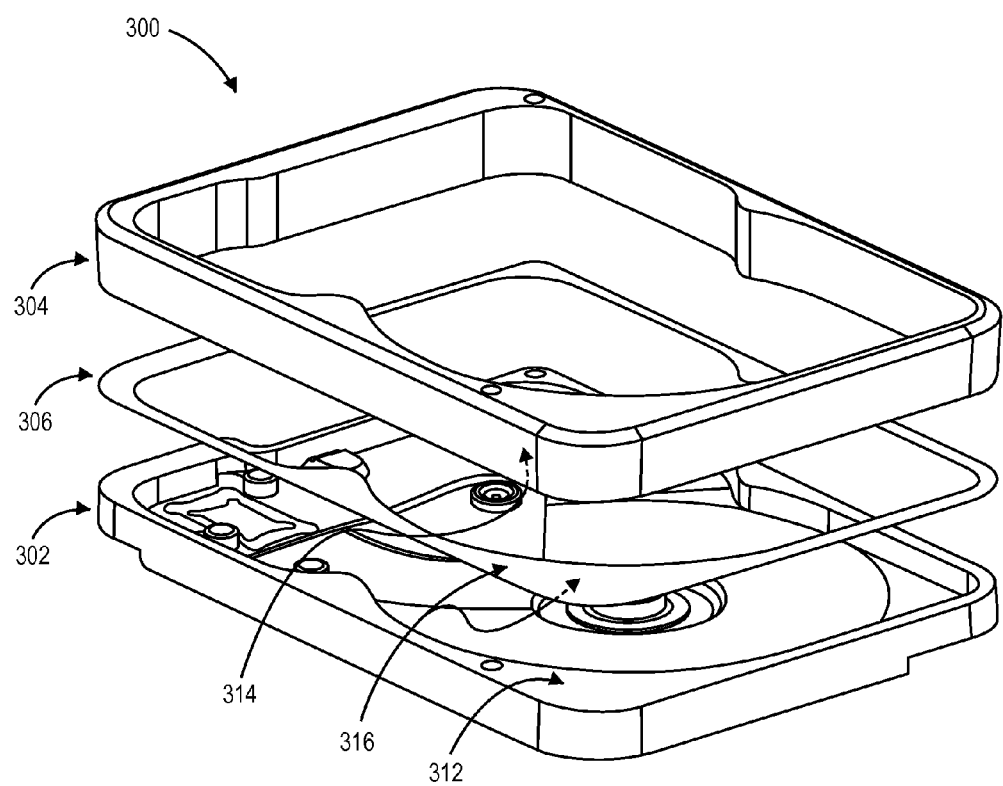
FIG. 3 provides an exploded view of the component parts of an extended height hard disk drive base plate.

FIG. 3 provides an exploded view 300 of the component parts of an extended height hard disk drive base plate. The view illustrated in FIG. 3 shows additional details of the base plate 102, shroud 104, and filler shim 106 illustrated in FIG. 1. In FIG. 3, the component parts of the extended height hard disk drive base plate include hard disk drive base plate 302, filler shim 306, and shroud 304.

A hard disk drive base plate 302 with formed parts (e.g., motor hub, actuator pivot bearing post, etc.) for supporting a hard disk drive assembly (e.g., spindle, motor, actuator, etc.) is illustrated in FIG. 3. In one embodiment, the base plate 302 may be formed by forging a base plate from an initial base plate, cut for an extruded sheet of blank material. The base plate 302 may be forged in a single forging operation performed on the initial base plate. The base plate 302 may also be forged with a sequence of progressive forging operations. A progressive die assembly, including multiple stations, may be used to perform the sequence of progressive forging operations by advancing the hard disk drive base plate from station to station to complete each of a plurality of progressive forgings. The specific forging operations at the different stages form, either partially or fully, parts on the hard disk drive base plate as it is advanced through the sequence of stages. Furthermore, the sequence of progressive forgings form, either partially or fully, specific parts on the hard disk drive base plate at specific stages in order to manage the movement of material caused by the forging operations, and to ensure a uniform thickness of the resulting fully formed hard disk drive base plate, such as base plate 302. Furthermore, the order of forging operations and formation of different parts ensures that the intricate details of the hard disk drive base plate are properly formed.

In another embodiment, the base plate may be formed using a conventional hard disk drive base plate forming technique, such as, press working a sheet of metal to form a base plate, press working a sheet of metal to form a side walls, and assembling the base plate and side walls to form the hard disk drive base plate.

The metal used for forming the hard disk drive base plate may be chosen based on various factors—for example, design requirements, desired material properties, reduced contamination (i.e., silicon, copper, zinc, etc. contamination) of the raw material for the hard disk drive base plate, and reduced natural magnetism of the hard disk drive base plate. In one embodiment, the hard disk drive base plate 302 is formed from aluminum alloy AL 6061. However, other aluminum alloys, such as AL 5052, AL 110, etc. may be used. Furthermore, due to design requirements, desired material properties, or other considerations, a 1000 series aluminum alloy may be selected for forming the component parts of the extended height hard disk drive base plate when a higher aluminum purity content, as compared to AL6061, is desired. When an AL1000 series alloy is chosen due to design considerations, each of the hard disk drive base plate 302, shroud 304, and filler shim 306 are formed from the selected same AL1000 series alloy. For alternative embodiments, however, other suitable materials such as, for example, cold rolled or low carbon steel may also be used.

FIG. 3 further illustrates a shroud 304 for extending the height of the walls of the hard disk drive base plate 302. In one embodiment, the shroud 304 is also formed from an aluminum alloy, such as AL6061. Furthermore, the aluminum alloy used to form the shroud 304 is selected to be the same alloy used to form the hard disk drive base plate 302.

When forming the shroud, shroud 304 is shaped such that a marrying surface 314 of the shroud corresponds to the shape of a marrying surface 312 of the hard disk drive base plate 302, as well as the marrying surfaces 316 of the filler shim. The marrying surfaces (e.g., surfaces 312, 314, and 316), as discussed herein, are the surfaces of the hard disk drive base plate 302, shim 306, and shroud 304 that are pressed together when the extended height hard disk drive base plate is formed. In one embodiment, the shroud 304 may also be formed by performing one or more forging operations using the techniques discussed above. The shroud 304 is formed by the one or more forging operations with a shape of a marrying surface 314 that corresponds to the marrying surface 312 of the top of the hard disk base plate walls, and with a required height, as discussed below.

Figure 7B:
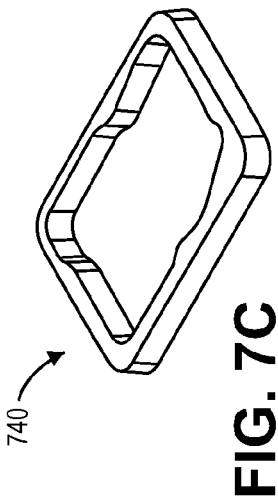
FIG. 7B illustrates an extruded hollow bar for forming a shroud.

In another embodiment, the shroud 304 may be formed using a metal extrusion process to form an extruded hollow bar 720, as illustrated in FIG. 7B. The extrusion process forms the hollow bar 720 with a cross-sectional shape 722 that corresponds to a shape of the marrying surface 312 of the hard disk drive base plate 302 walls. A section 724 of the extruded hollow bar 720 may then be cut from the length of the hollow bar to obtain shroud 304 with the required height. A plurality of sections may be cut from the extruded hollow bar 720 to obtain a plurality of shrouds with the required height. In one embodiment, sections of varying heights may be cut from the extruded hollow bar to obtain shrouds of varying heights based on design considerations of resulting joined hard disk drive base plates.

Returning to FIG. 3, the height of the formed shroud 304 may be selected based on design considerations, such as a required height of a formed hard disk drive base plate's walls for accommodating assembled hard disk drive components, as well as other factors. In one embodiment, the combined heights of the walls of the hard disk drive base plate 302, shroud 304, and the filler shim 306 result in a total height, where the total height is the height required for a specific use or design requirement of the joined hard disk drive base plate (e.g., hard disk drive base plate 100 illustrated in FIG. 1). The relative heights of the walls of the hard disk drive base plate 302, shroud 304 and filler shim 306 may be given according to the formula, $H_{total}=H_{base\ plate}+H_{shroud}+H_{shim}$, such that the relative base plate 302, shroud 304, and filler shim 306 heights can be adjusted so long as the sum of their heights equals the total height, $H_{total}$. In one embodiment, $H_{total}$ is greater than 15 millimeters.

The filler shim 306, illustrated in FIG. 3, is a thin strip of metal. The filler shim 306 may be formed from a stamping process applied to a metal sheet, as will be discussed in greater detail below in FIGS. 5A and 5B. A shape of the marrying surfaces 316 of the stamped filler shim 306 correspond to the shape of the marrying surface 314 of the shroud 304 and the marrying surface 312 of the hard disk drive base plate 302. Furthermore, the metal sheet may have a thickness in the range of 0.3 to 0.8 millimeters resulting in a filler shim with $H_{shim}$ in that thickness range.

Figure 4:
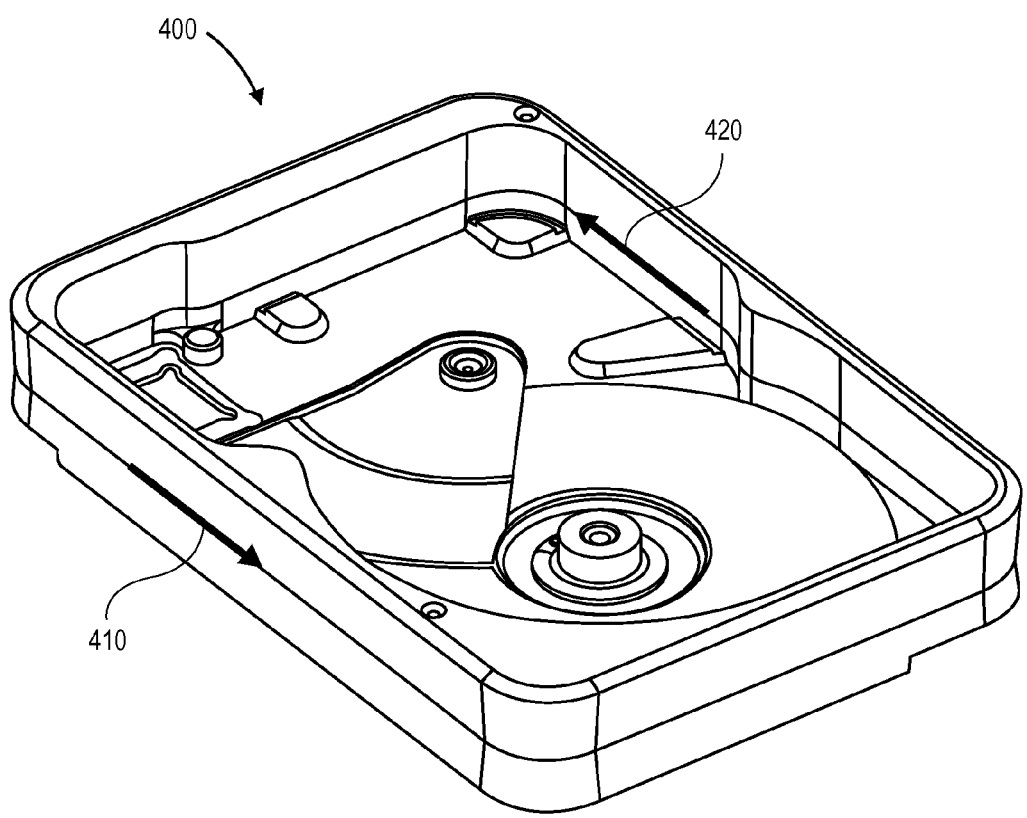
FIG. 4 illustrates welding paths for joining the hard disk drive base plate, shroud, and filler shim to form the hard disk drive base plate with an extended height.

The filler shim 306 is to be disposed in between the hard disk drive base plate 302 and the shroud 304 during a welding process that joins the marrying surfaces of the hard disk drive base plate 302, shroud 304, and filler shim 306. As illustrated in FIG. 4, the hard disk drive base plate 302, filler shim 306, and shroud 304 are joined by performing a welding process along exterior 410 and interior 420 welding paths of the extended height hard disk drive base plate 400. The interior and exterior welding may be performed on the extended height hard disk drive base plate in any order (i.e., interior 420 then exterior 410, or exterior 410 then interior 420), as well as simultaneously, and in any direction. The welding process may utilize different welding techniques, such as plasma welding, laser welding, tungsten inert gas (TIG) welding, gas tungsten arc welding (GTAW), as well as other welding techniques, when joining the hard disk drive base plate 302, shroud 304, and filler shim 306

In embodiments, the stamped filler shim 306 may be formed from AL4047, AL 4043, or other 4000 series aluminum alloy. The 4000 series aluminum alloy is utilized to achieve proper fusion during the welding process when forming the extended height hard disk drive base plate. Furthermore, use of the 4000 series aluminum alloy, when joining an AL6061 base plate and an AL6061 shroud, assists in the prevention of thermal shock and hot cracking during the welding process.

The forming of the component parts (e.g., the hard disk drive base plate 302, shroud 304, and filler shim 306) discussed above in FIGS. 1-3 may be performed in any order, and at different or the same times. Thus, the processes illustrated and discussed below in FIG. 5A, FIG. 6, and FIG. 7A need not be performed in any particular order, so long as each component part has been formed prior to the joining process discussed below in FIG. 8.

Figure 5A:
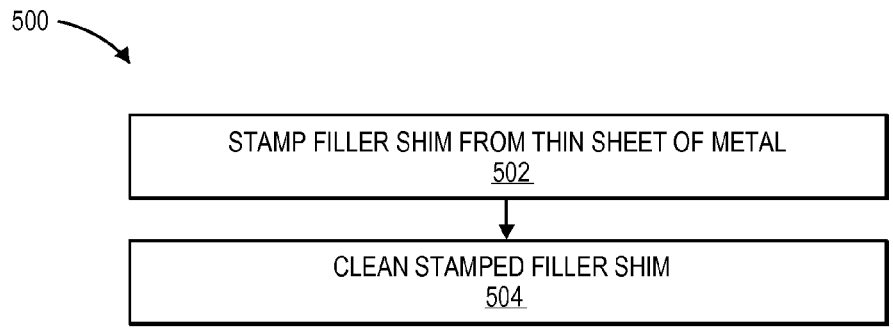
FIG. 5A illustrates a block diagram of a method of forming a filler shim.
Figure 5B:
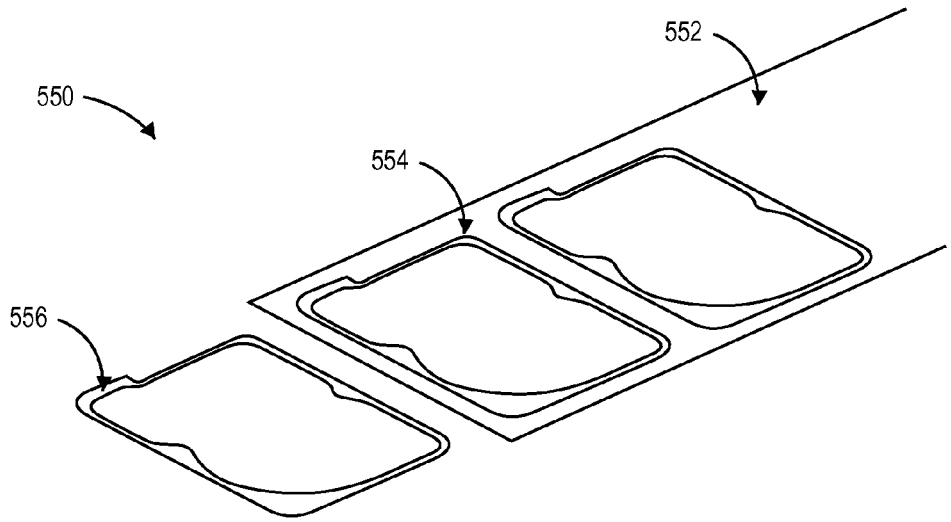
FIG. 5B illustrates the formation of a filler shim from the stamping of a sheet of metal.

FIG. 5A illustrates a block diagram of a method 500 of forming a filler shim. In one embodiment, filler shim 556 of FIG. 5B may be formed from the stamping process of FIG. 5A. A filler shim 556 is stamped from a thin sheet of metal 552 (block 502). The sheet of metal 552 may be an aluminum alloy, such as AL4047, having a thickness in the range of 0.3 to 0.8 millimeters. As discussed herein, one or more stamps (not shown), may be utilized by machine or stamping presses to produce the desired form of the stamped filler shim 556. A first press or punch operation may be utilized to form a desired inner shape of filler shim by removing the material from the sheet of metal 552, as illustrated with partially formed filler shim 554. A second press or punch operation may then be performed to form a desired outer shape of the filler shim by removing a filler shim, such as filler shim 556, from the sheet of metal 552.

The stamped filler shims, such as filler shim 556, are then cleaned (block 504). During the stamping performed above in block 502, grease, residue, or other forms of contamination may accumulate on the stamped filler shims. Thus, one or more cleaning processes, such as solvent cleaning, alkaline detergent cleaning, etc. may be used to clean the stamped filler shims. Furthermore, the selected cleaning process(es) may be performed along a conveyor system, where the stamped filler shims are washed while traveling along a conveyor belt. The cleaning process(es) could also, or alternatively, include a rack and basket type system, where filler shims are put into racks or baskets and lowered into cleaning tanks along a conveyor line. Other cleaning processes may be used consistent with the discussion herein.

Figure 6:
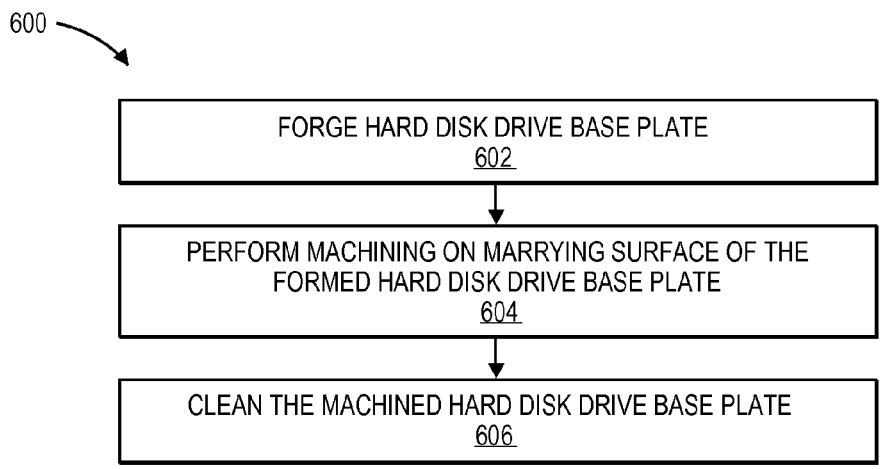
FIG. 6 illustrates a block diagram of a method of forming a hard disk drive base plate.

FIG. 6 illustrates a block diagram of a method 600 of forming a hard disk drive base plate. In one embodiment, the hard disk drive base plate is forged (block 602). As discussed above, an initial blank base plate may be advanced through a plurality of stations of a transfer die assembly. Parts are forged on the initial blank base plate to form a hard disk drive base plate (e.g., base plate 102 in FIG. 1 or base plate 302 in FIG. 3). The forging can include forming various parts of the hard disk drive base plate, such as a motor hub, a voice coil motor relief surface, and an actuator pivot bearing post. Other parts are also forged from the initial blank to form the final hard disk drive base plate form. The forging may occur over a sequence of stages, where each stage in the sequence involves forming, either partially or fully, various features of the hard disk drive base plate. Furthermore, the progressive forging may also be used for forming a shroud (e.g., shroud 104 in FIG. 1 or shroud 304 in FIG. 3).

Machining is then performed on the marrying surface of the formed hard disk drive base plate (block 604). In one embodiment, the machining, such as computer numerical controlled (CNC) machining, is performed on the surface 312 of the formed hard disk drive base plate 302 that will be in contact with the stamped filler shim 306 during welding. In one embodiment, the machining refines the shape of the marrying surface, ensures surface evenness, etc. prior to the joining process discussed below in FIG. 8.

The hard disk drive base plate is then cleaned (block 606). As discussed above, residual dirt and/or oil may be deposited on the base plate during the forming and/or machining processes of blocks 606. Thus, cleaning processes similar to those employed in block 504 of FIG. 5 may be performed on the formed and machined hard disk drive base plate.

Figure 7C:
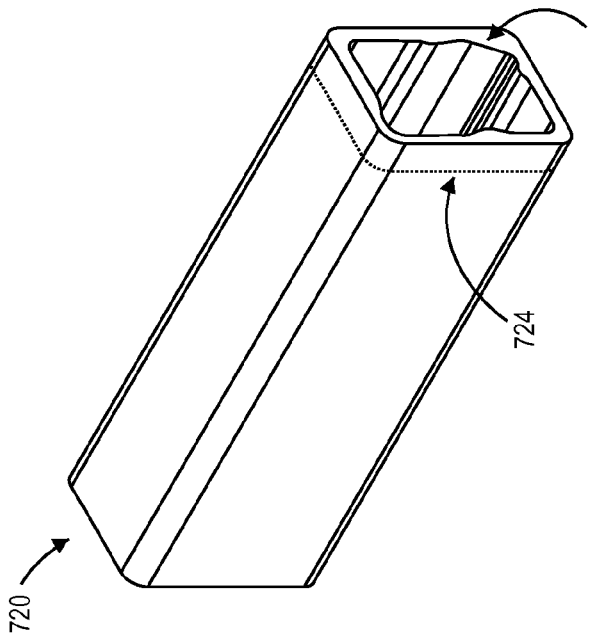
FIG. 7C illustrates a formed shroud.
Figure 7A:
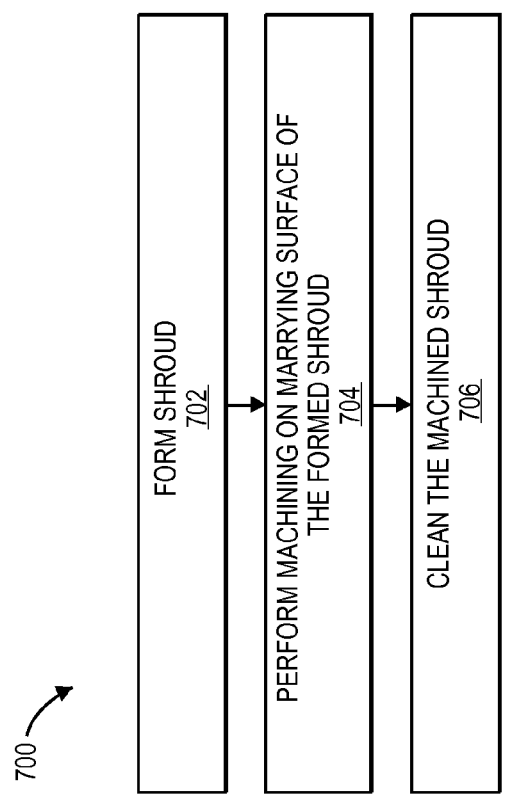
FIG. 7A illustrates a block diagram of a method of forming a shroud.

FIG. 7A illustrates a block diagram of a method 700 of forming a shroud. As discussed herein, the shroud is utilized to extend the height of the walls of a formed hard disk drive base plate.

The process begins by forming the shroud (block 702). In one embodiment, a formed shroud (e.g., shroud 740 illustrated in FIG. 7C) may be formed through a series of one or more forgings, as discussed herein. In another embodiment, the formed shroud 740 is formed by cutting a section 724 from an extruded hollow bar 720, as illustrated in FIG. 7B. In this embodiment, the cut section 724 forms shroud 740. As discussed herein, the extruded hollow bar has a cross-sectional shape 722 that corresponds to the shape of the marrying surface 316 of the stamped filler shim 306 as formed in FIG. 5A, which in turn corresponds to the marrying surface 312 of the hard disk drive base plate 302 as formed in FIG. 6. Furthermore, the section 724 cut from the extruded hollow bar 720 may have a thickness that ensures the extended wall height the joined hard disk drive base plate (i.e., the finished welded base plate, shim, and shroud) exceeds 15 millimeters and/or a height defined by design requirements.

Machining is then performed on the marrying surface of the formed shroud (block 704). The machining, such as CNC machining, is utilized to refine the shape, ensure surface evenness, etc. of the marrying surface 314 of the shroud (e.g., shroud 308 or shroud 740 formed at block 702), as preparation for the joining process discussed below in FIG. 8.

The formed and machined shroud is then cleaned (block 706), as discussed herein.

Figure 8:
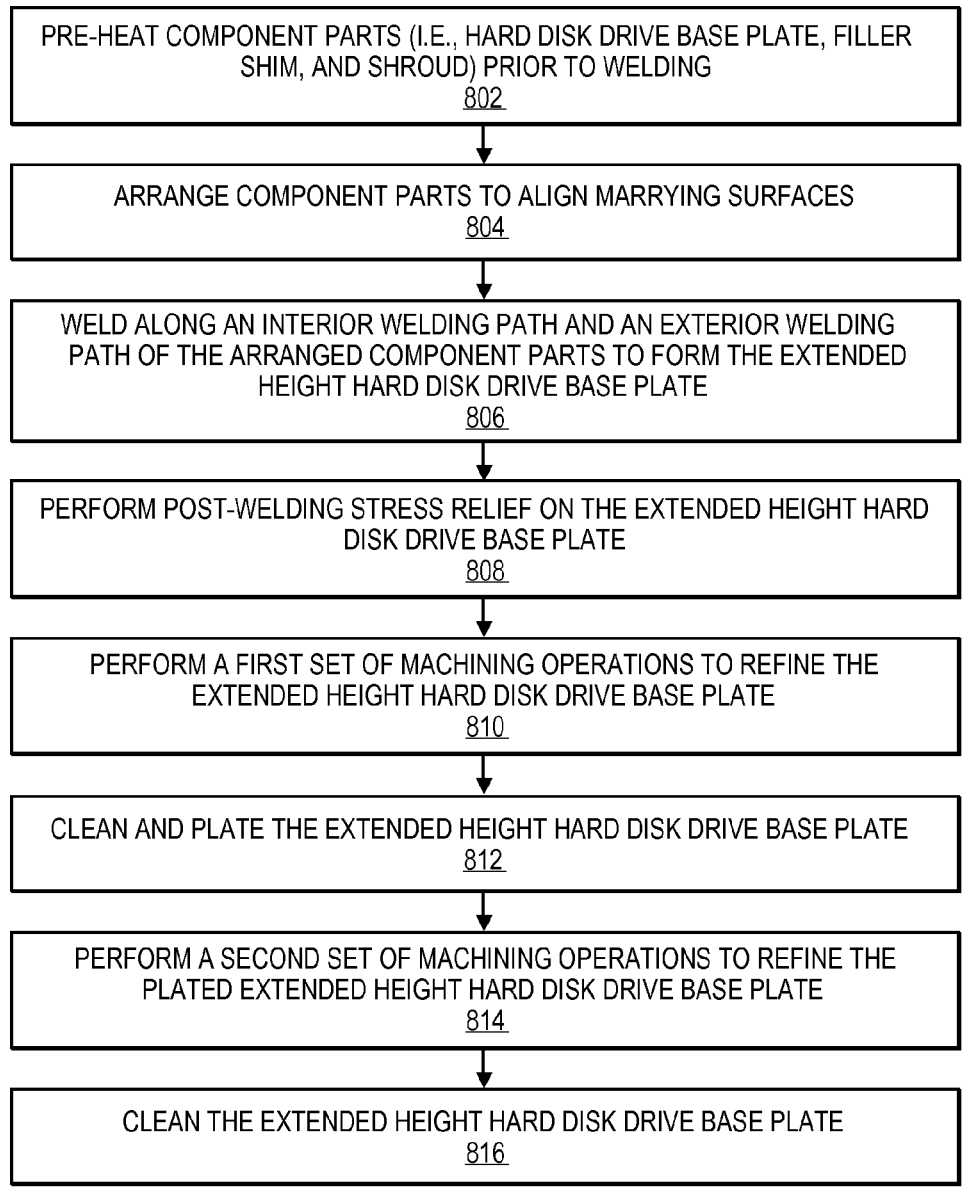
FIG. 8 illustrates a block diagram of a method for joining the formed hard disk drive base plate, shroud, and filler ship to form the hard disk drive base plate with an extended height.

After the component parts have each been formed, machined, and cleaned, the parts may then be joined to form the extended height hard disk drive base plate. FIG. 8 illustrates a block diagram of a method 800 for joining a hard disk drive base plate, shroud, and filler shim to form the hard disk drive base plate with an extended height. For example, the process discussed below in FIG. 8 can be used to form the extended height hard disk drive base plate 100 illustrated in FIG. 1.

The process begins by pre-heating the component parts prior to welding (block 802). In one embodiment, the component parts comprise the formed hard disk drive base plate, the formed shroud, and the stamped filler shim. The pre-heating of the component parts is performed as part of stress relief and preparation of the component parts for welding. That is, during welding and without pre-heating, the temperature of the component parts will be raised dramatically, leading to potential thermal shock, thermal cracking, material distortion, and other unwanted side effects. By pre-heating the component parts in block 802, the effects of thermal shock, thermal cracking, material distortion, etc. are reduced and/or eliminated, thereby ensuring better fusion and re-alloying of the component parts during welding.

After pre-heating, the component parts are arranged to align the marrying surfaces of the hard disk drive base plate, filler shim, and shroud (block 804). As illustrated in FIG. 3, marrying surface 312 of hard disk drive base plate 302 is aligned with a first marrying surface 316 of the filler shim 306. Similarly, a second marrying surface 316 of the filler shim 306 is aligned with marrying surface 314 of shroud 304.

After the marrying surfaces are aligned, welding is performed along an interior welding path and an exterior welding path of the arranged component parts to form the extended height hard disk drive base plate (block 806). As discussed herein, the welding processes performed at block 808 may be a plasma, laser, TIG, GRAW or other welding process. Furthermore, the welding along the interior welding path and the welding along the exterior welding path may be performed in either order (i.e., inner then outer, or outer than inner), as well as simultaneously. Once the welding is complete, an unfinished version of the extended height hard disk drive base plate has been formed.

Post-welding stress relief is then performed (block 808). Post welding stress relief can involve gradually lowering the temperature of the formed, but unfinished, extended height hard disk drive base plate. The gradual lowering of the formed extended height hard disk drive base plate again prevents against thermal shock, thermal cracking, material distortion, etc. as discussed above.

In one embodiment, heating and cooling conveyor systems or heating and cooling chambers may be utilized for pre-welding stress relief and post-welding stress relief, as discussed in blocks 802 and 808. Furthermore, a robot or other mechanized means may be employed to perform the component part arrangement and welding discussed in blocks 804 and 806, as well as to remove the pre-heated component parts from the heating conveyor or chamber, and to place the welded extended height hard disk drive base plate on the cooling chamber or on the cooling conveyor system.

A first set of post-weld machining processes are performed to refine the shape of the extended height hard disk drive base plate (block 810). CNC based machining may be performed of the base plate surfaces and/or walls of the extended height hard disk drive base plate to obtain the shapes and features of the extended height hard disk drive base plate. Once the machining is complete, the extended height hard disk drive base plate is cleaned and plated (block 812). As discussed herein, due to machining operations, as well as the welding, grease, residue, or other contaminants may gather on the extended height hard disk drive base plate. A cleaning process, as discussed herein, is therefore applied to the extended height hard disk drive. Once cleaned, an E-coating, EN-plating, Bimetal Black EN plating may be applied to the hard disk drive base plate to help prevent against corrosion of the hard disk drive base plate.

A second set of post-weld machining processes are performed after cleaning and plating process to further refine critical areas of the extended height hard disk drive base plate (block 814). The post-welding machining processes include, for example, performing CNC machining to refine datums, a motor hub area, an actuator pole, actuator sitting areas, a VCM sitting area, blind holes, and thread forming in blind holes of the extended height hard disk drive base plate.

A second cleaning of the extended height hard disk drive base plate is performed after the second machining (block 816), utilizing one or more of the cleaning techniques discussed herein. After the second cleaning, the extended height HDD base plate is ready for packaging, shipment, assembly of a hard disk drive, etc.

Each of the blocks illustrated in FIGS. 5A, 6, 7A, and 8, as described above, may be accomplished in different stages of a system for producing hard disk drive base plates with extended heights. The stages may be performed sequentially, in parallel, partially in parallel, partially sequentially, etc. For example, a stage in the production system may involve pre-heating each of the component parts in parallel, another stage in production system may involve sequentially aligning an initial hard disk drive base plate, with a filler shim, and then aligning those with a shroud, and yet another stage may include joining the initial base plate, filler shim, and shroud through a welding process. Additional stages may be used for forming finished hard disk drive base plates with an extended height in accordance with the discussion and illustrations set forth herein.

In the foregoing specification, the invention has been described in reference to specific exemplary embodiments thereof. It will, however, be evident that various modifications and changes may be made thereto without departing from the described spirit and scope of the invention. The specification and drawings are, accordingly, to be regarded as illustrative rather than a restrictive sense.

What is claimed is:

1. A method for forming a hard disk drive base plate with an extended height, comprising:
    forming an initial hard disk drive base plate from a blank cut from an extruded sheet, the initial hard disk drive base plate having walls of an initial height that extend vertically around a perimeter of the initial had disk drive plate;
    forming a filler shim;
    forming a shroud, wherein the formed shroud is hollow with a top and a bottom of the formed shroud being open and the formed shroud having a cross-sectional shape that corresponds to a shape of a marrying surface of the initial hard disk drive base plate; and
    joining the initial hard disk drive base plate, the filler shim, and the shroud to extend the initial height of the walls of the formed initial hard disk drive base plate and to form the hard disk drive base plate with the extended height.

2. A method for forming a hard disk drive base plate with an extended height comprising:
    forming an initial hard disk drive base plate from a blank cut from an extruded sheet;
    forming a filler shim;
    forming a shroud, wherein the formed shroud is hollow with a cross-sectional shape that corresponds to a shape of a marrying surface of the initial hard disk drive base plate; and
    joining the initial hard disk drive base plate, the filler shim, and the shroud to extend a height of walls of the formed initial hard disk drive base plate and to form the hard disk drive base plate with the extended height, wherein joining the initial hard disk drive base plate, the filler shim, and the shroud further comprises:

arranging the initial hard disk drive base plate and the filler shim to align a marrying surface of the initial hard disk drive base plate with a first marrying surface of the filler shim;

arranging the shroud and the aligned initial hard disk drive base plate and filler shim to align a marrying surface of the shroud with a second marrying surface of the filler shim; and welding along an interior path and an exterior path of the arranged initial hard disk drive base plate, filler shim, and shroud to join the initial hard disk drive base plate, the filler shim, and the shroud.

3. The method of claim 2, wherein each of the initial hard disk drive base plate, the shroud, and the filler shim are pre-heated prior to the welding, and the joined initial hard disk drive base plate, the filler shim, and the shroud are cooled after the welding, to prevent against thermal shock, thermal crack, and material distortion.

4. The method of claim 2, wherein the filler shim is disposed in-between the initial hard disk drive base plate and the shroud during the arrangement of the initial hard disk drive base plate, the filler shim, and the shroud.

5. The method of claim 1, wherein the hard disk drive base plate with the extended height has a total height of at least 15 millimeters.

6. The method of claim 1, wherein the initial hard disk drive base plate is formed by performing a sequence of forgings on the blank to progressively form parts of a hard disk drive base plate.

7. The method of claim 1, wherein the shroud is formed by cutting a section from a hollow bar, and wherein the hollow bar is formed from a metal extrusion process that generates the hollow bar.

8. The method of claim 1, wherein the shroud is formed by performing a sequence of forgings on an initial blank to form a finished shroud.

9. The method of claim 1, wherein the filler shim is formed from punching the filler shim from a sheet of metal, wherein the sheet of metal has a thickness in the range of 0.3 to 0.8 millimeters.

10. The method of claim 1, further comprising:

cleaning the formed hard disk drive base plate with the extended height;

applying a surface treatment to the cleaned hard disk drive base plate with the extended height;

performing machining on the surface treated and cleaned hard disk drive base plate with the extended height to refine one or more parts of the surface treated and cleaned hard disk drive base plate with the extended height; and cleaning the machined hard disk drive base plate with the extended height to produce a finished hard disk drive base plate with an extended height.

11. The method of claim 10, wherein the applied surface treatment is one of an Electroless Nickel plating, Electro-coating, or Bimetal Black Electroless Nickel plating.

12. The method of claim 1, wherein the initial hard disk drive base plate, the shroud, and the filler shim are each formed from an aluminum alloy.

13. The method of claim 12, wherein the initial hard disk drive base plate and the shroud are formed from aluminum 6061, and the filler shim is formed from aluminum 4047.

14. The method of claim 12, wherein the initial hard disk drive base plate, the shroud, and the filler shim are each formed from a single type of aluminum alloy, and wherein the single type of aluminum alloy is a 1000 series aluminum alloy.

* * * * *